United States Patent [19]

Nerger

[11] Patent Number: 4,872,718
[45] Date of Patent: Oct. 10, 1989

[54] SUPPORT FOR A GRIPPER FOR AN INDUSTRIAL ROBOT

[75] Inventor: Klaus K. Nerger, Witten, Fed. Rep. of Germany

[73] Assignee: Mannesmann Aktiengesellschaft, Düsseldorf, Fed. Rep. of Germany

[21] Appl. No.: 122,914

[22] Filed: Nov. 19, 1987

[30] Foreign Application Priority Data

Dec. 1, 1986 [DE] Fed. Rep. of Germany ....... 3640973

[51] Int. Cl.⁴ .......................... B25J 17/02; B25J 19/06
[52] U.S. Cl. .................................. 294/86.4; 294/907; 414/730; 901/29; 901/49
[58] Field of Search .................. 294/1.1, 86.4, 88, 106, 294/907; 248/900; 414/729, 730, 735; 901/27–31, 41, 46, 49, 50, 45

[56] References Cited

U.S. PATENT DOCUMENTS

| 4,540,331 | 9/1985 | Stanner et al. | 901/29 X |
|---|---|---|---|
| 4,639,184 | 1/1987 | Knasel et al. | 901/29 X |
| 4,655,674 | 4/1987 | Kohler et al. | 901/29 X |
| 4,661,037 | 4/1987 | Sugino et al. | 901/45 X |
| 4,661,038 | 4/1987 | Kohler et al. | 901/49 X |
| 4,717,003 | 1/1988 | McCormick et al. | 901/49 X |

FOREIGN PATENT DOCUMENTS

| 2556595 | 7/1976 | Fed. Rep. of Germany | 294/86.4 |
|---|---|---|---|
| 3241132 | 5/1984 | Fed. Rep. of Germany | 901/49 |
| 3445849 | 6/1986 | Fed. Rep. of Germany | . |
| 2068891 | 8/1981 | United Kingdom | 294/86.4 |

Primary Examiner—Johnny D. Cherry
Attorney, Agent, or Firm—Horst M. Kasper

[57] ABSTRACT

A fixed plate (2) is mounted to an end of a robot or working arm (1) by means of screws (3). The fixed plate (2) has an extraordinary multi-cornered, canted, central opening (2c). A connection plate (4) for a gripper (5) is disposed in this central opening by leaving available a slot X for motion. The fixed plate (2) and the connection plate (4) are provided with bores (2a) and (4a) having conical openings (2b) and (4b) for centering cones (6b) of tapered countersunk pins (6) and (6.1). The diameter of the bores (2b) and (4a) is larger by a factor of two times the size of the available slot for motion as compared to the diameter of the tapered countersunk pins (6).

20 Claims, 2 Drawing Sheets

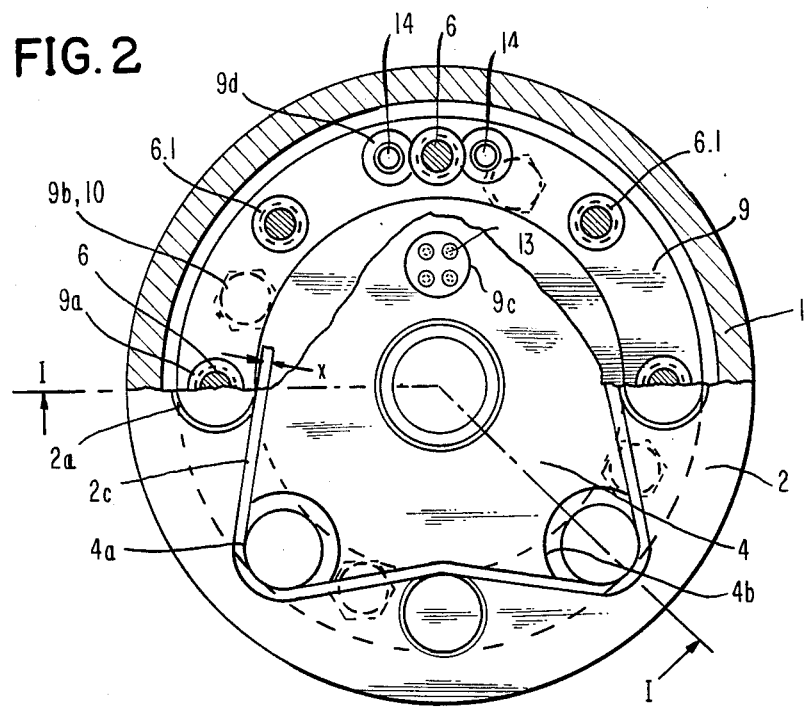
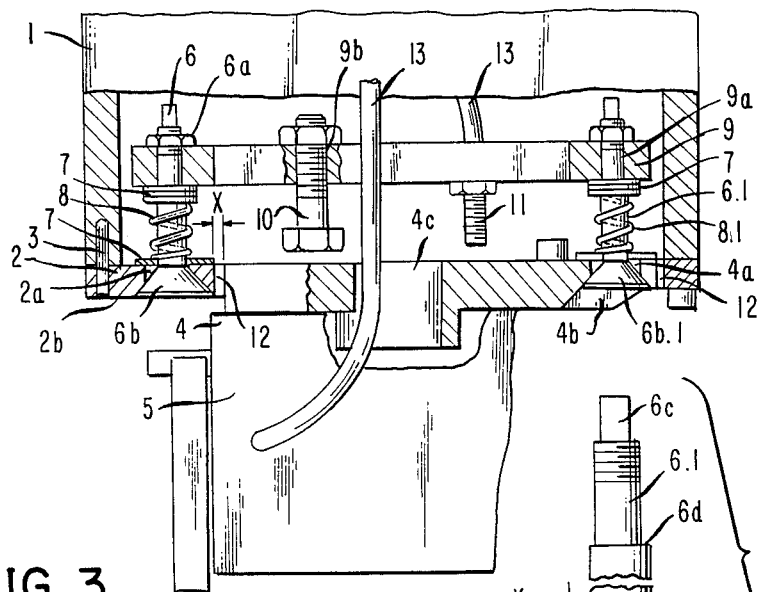
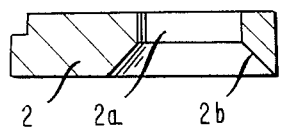
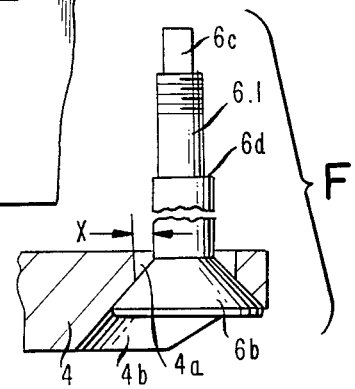

SUPPORT FOR A GRIPPER FOR AN INDUSTRIAL ROBOT

BACKGROUND OF THE INVENTION

1. Field of the Invention

The invention relates to a support for a gripper for an industrial robot which support is provided with plates for the support of a connection plate for mounting the gripper at the end of the work arm, where the plates are maintained at a distance and where the connection plate protrudes with a mounting means for the gripper through one plate disposed toward the gripper.

2. Brief Description of the Background of the Invention Including Prior Art

A gripper of the kind described in the present application is known from the German patent application Laid Open DE-OS 34 45 849 as part of a pneumatic gripper. This support allows, after the placing of an object at the gripper, for the gripper to adapt to an inclined position or an error position of the object, and only then is it possible for the gripper to be displaced laterally relative to the robot arm.

SUMMARY OF THE INVENTION

PURPOSES OF THE INVENTION

It is an object of the present invention to provide a movable support for the gripper of an industrial robot such that the gripper is maintained in a precisely defined starting position and can be deflected by the gripping force of the mounted gripper in all directions.

It is another object of the present invention to provide a gripper attachment for an industrial robot, where the gripper connection plate passes at all times, after each deflection, automatically again into a specific starting position.

It is yet another object of the present invention to provide a method for resiliently supporting a gripper arm which allows a gripper arm to adapt to an object position, while still precisely defined in its starting position.

These and other objects and advantages of the present invention will become evident from the description which follows.

BRIEF DESCRIPTION OF THE INVENTION

In accordance with the invention, a support for a gripper of an industrial robot comprises a fixed plate, a connection plate, and a spring-supported plate. There are also provided means for maintaining an approximate relative position of the spring-supported plate versus the fixed plate, for maintaining an approximate relative position of the connection plate versus the spring-supported plate, a fixed-plate stop providing a rest position between fixed plate and spring-supported plate, fixed-plate springs maintaining a relative position between fixed plate and spring-supported plate corresponding to the fixed-plate stop, a connection-plate stop providing a rest position between connection plate and spring-supported plate, connection-plate springs maintaining a relative position between spring-supported plate and connection plate corresponding to the connection-plate stop.

The support for a gripper of an industrial robot can comprise a mounting means for a gripper located at the connection plate. The connection plate can be mounted to the side of the spring-supported plate where the gripper is placed. The fixed plate can form an abutment for the fixed-plate stop. The connection plate is preferably disposed on the same side of the spring-supported plate as is the connection plate.

There can be provided stops as centering cones of tapered countersunk pins. The fixed-plate springs are preferably helical compression springs which are guided by the tapered countersunk pins. The connection-plate springs can be helical compression springs which are guided by the tapered countersunk pins. Preferably, the tapered countersunk pins are attached to a respective plate with a corresponding nut near the end of the tapered countersunk pin opposite to an end of the tapered countersunk pin corresponding to a taper of the tapered countersunk pin. A respective opposite plate, disposed opposite to the respective plate, can be provided with openings for guiding and for providing support to the tapered countersunk pins at their taper.

In accordance with the invention, the openings for guiding and for providing support to the tapered countersunk pin are preferably formed as bores at the side of the respective opposite plate with the smaller clear diameter of the opening. The tapered countersunk pins can be guided through bores of the fixed plate and of the connection plate. The centering cones of the tapered countersunk pins, guiding the fixed plate springs, rest preferably at openings of the fixed plate. The centering cones of the tapered countersunk pins, guiding the fixed plate springs, rest preferably at openings of the fixed plate. The centering cones of the tapered countersunk pins, guiding the connection plate springs, can rest at openings of the connection plate.

The support for a gripper of an industrial robot can comprise the tapered countersunk pins which are provided with threads as well as adjustment means for adjustably positioning the tapered countersunk pins with their threads in the spring-supported plate.

In the support of a gripper in accordance with the invention, the tapered countersunk pins are preferably guided in fitted bores of the spring-supported plate. The tapered countersunk pins can be axially fixed with a respective nut and a respective step in the pin diameter.

The fixed plate is preferably provided with an opening for locating the connection plate such that a slot allowing relative motion of the fixed plate and the connection plate is provided between the edge of the connection plate and the opening of the fixed plate.

In the support for a gripper of an industrial robot, the tapered countersunk pins, corresponding to the fixed plate and the connection plate, are preferably placed in an alternating sequence on the spring-supported plate. The taper can form an angle of from about 40 to 50 degrees relative to the pin axis and the pin can be provided with two shoulders for positional definition.

The pins corresponding to the fixed plate and the connection plate are preferably placed along a substantially circular line on the spring-supported disk. The opening for locating the connection plate can be of a modified star-shape where the tips of the star arms follow the outer border of the tapered countersunk pin locations on the connection plate, and where the valleys between the star arms follow the inner border of the tapered countersunk pin locations on the fixed plate.

The support for a gripper of an industrial robot can comprise stop detent screws mounted at the spring-sup ported plate and directed toward the fixed plate and, respectively, the connection plate.

An approachment sensor is preferably attached at the fixed plate and directed to the fixed plate and to the connection plate. This approachment sensor can be an electro-magnetic approachment sensor.

The support for a gripper of an industrial robot preferably comprises a washer disposed between the fixed-plate spring and the fixed plate and between the connection plate spring and the connection plate.

A washer can be disposed between the fixed-plate spring and the spring-supported plate and between the connection-plate spring and the spring-supported plate.

In accordance with the invention, the plates are employed as a spring-supported plate which is maintained by springs against a stop. The springs are supported on a second fixed plate which provides an abutment for the fixed plate providing the stop. The connection plate or disk for the gripper or the like is maintained at the spring-supported plate on the same side of the fixed plate as the connection plate. The connection plate can be pressed by way of springs against the stops. This double spring support of two plates relative to each other, that is, of the spring-supported plate relative to the fixed plate, and of the connection plate relative to the spring-supported plate, allows for a uniform or a canted yield of the connection plate relative to the fixed plate in all directions. This floating support in addition serves as a buffer upon the laying down of the object to be transported and, furthermore, provides a protection of the apparatus in case a collision should occur.

According to a further embodiment of the invention, the stops and the abutments are provided as nuts and as centering cones of tapered pins. The springs are guided between the spring-supported plate and the fixed plate or, respectively, the spring-supported plate and the connection plate, on the tapered pins. The plates have bores for the tapered pins and recesses which are adapted to the centering cones of the tapered pins. In order to vary the pretensioning of the springs, these springs can have disposed, between spring and plate, one or several support disks or washers. Alternatively, the tapered pins can be mounted adjustably with a thread on the spring-supported plates. The tapered pins can be guided in fitted bores of the spring-supported plate and they can be axially fixed with nuts, with shoulders of the cylinder sections and with tapered countersunk pins.

According to a further embodiment of the invention, the fixed plate is provided with an opening for receiving the connection plate such that a slot-allowing movement is present between the edge of the connection plate and the opening of the fixed plate. This slot for motion allows a lateral evasion of the connection plate versus the end of the work arm. In order to allow this, the bores in the fixed plate and in the connection plate are larger than the diameter of the tapered pins.

Detent screws can be present and attached to the spring-supported plate for limiting the motion of the parts relative to one another and, in particular, between the spring-supported plate and the fixed plate and the connection plate, respectively. Preferably, at least one approachment initiator and distance sensor can be located on one of the plates for sensing and delivering a signal relating to the distance of the plates.

A method for resiliently gripping of an object with an industrial robot comprises mounting a fixed plate to a gripper stand, machining a fixed-plate stop providing a rest position between fixed plate and a spring-supported plate, resiliently supporting the spring-supported plate with fixed-plate springs maintaining a relative distance between fixed plate and spring-supported plate corresponding to the fixed-plate stop, maintaining an approximate relative position of the spring-supported plate versus the fixed plate, machining a connection plate stop providing a rest position between the spring-supported plate and a connection plate, resiliently supporting the connection plate with connection-plate springs maintaining a relative distance between spring supported plate and connection plate corresponding to the connection-plate stop, maintaining an approximate relative position of the connection plate versus the spring-supported plate, mounting a gripper to the connection plate on the same side where the gripper is placed such that the fixed plate forms an abutment for the fixed-plate stop and such that the connection plate is disposed on the same side of the spring-supported plate as is the connection plate.

The method for resiliently gripping of an object with an industrial robot preferably comprises providing the stops as centering cones of tapered countersunk pins. It can also include forming openings for guiding and for providing support to tapered countersunk pins as bores on the side for positioning a respective opposite plate with a smaller clear diameter of the opening. Preferably, the tapered countersunk pins can be guided through bores of the fixed plate. The helical compression springs with the tapered countersunk pins can be guided for maintaining a distance between fixed plate and spring-supported plate. The tapered countersunk pins can be guided through bores of the connection plate. The helical compression springs with the tapered countersunk pins can be guided for maintaining a distance between connection plate and spring-supported plate. A respective opposite plate is preferably placed on an opposite side of said respective plate provided with openings for guiding and for providing support to the tapered countersunk pins at the location of their taper. The tapered countersunk pins can be attached to a respective plate with a corresponding nut near an end of the tapered countersunk pin opposite to an end of the tapered countersunk pin corresponding to a taper of the tapered countersunk pin. The centering cones of the tapered countersunk pins guiding the fixed plate springs can rest at openings of the fixed plate. Preferably, the centering cones of the tapered countersunk pins guiding the connection plate springs rest at openings of the connection plate.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention:

FIG. 1 is a view of a longitudinal section through the support according to section line I—I of FIG. 2;

FIG. 2 is a detail view of the embodiment of FIG. 1, in part in section;

FIG. 3 is a view of a section of FIG. 1 on an enlarged scale; and

FIG. 4 is a view of a section of the embodiment of FIG. 1 on an enlarged scale;

DESCRIPTION OF INVENTION AND PREFERRED EMBODIMENT

Figure 5:
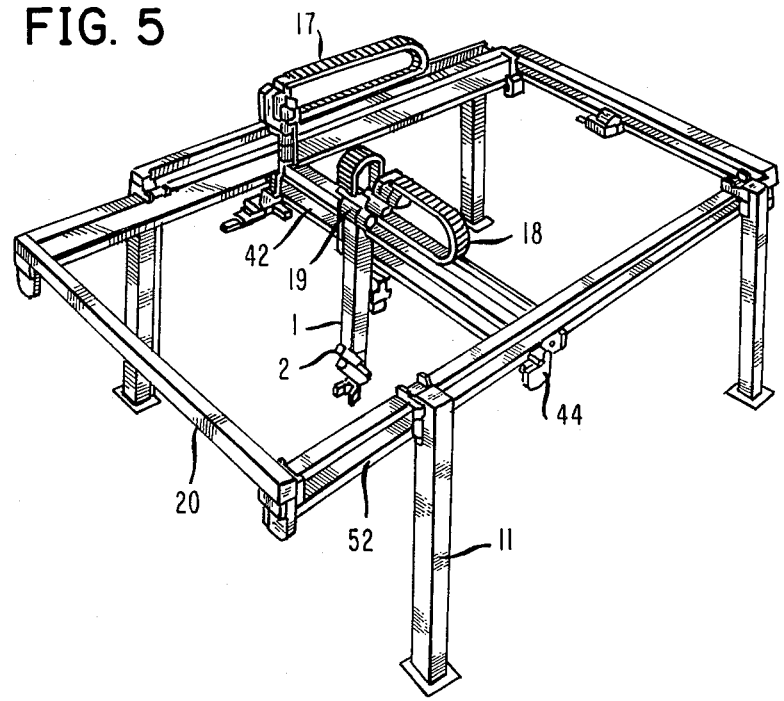
FIG. 5 is a perspective view of a system employing the support or gripper according to the invention.

A support for a gripper of an industrial robot comprises plates maintained at a distance to each other at the end of a work arm of an industrial robot for supporting a gripper connection plate 4, which gripper connection plate protrudes with a junction mounting for the gripper through the plate 2 disposed toward the gripper. The improvement can comprise spings 8 which maintain one of the plates as a spring-supported plate 9 against a stop, where the springs 8 are supported on another fixed plate 2, providing an abutment for furnishing a detent stop, and where the connection plate for the gripper 5 or the like is supported at the spring-supported plate 9 on the side of the fixed plate 2, which spring supported plate can be pressed by springs 8.1 against stops.

In the support for a gripper of an industrial robot according to the invention, the detent stops and the abutments are preferably nuts 6a and centering cones 6b of tapered countersunk pins 6, 6.1, where springs 8, 8.1 are guided between the spring-supported plate 9 and the fixed plate 2 or, respectively, between the spring-supported plate 9 and the connection plate 4, where the tapered countersunk pins 6, 6.1 are guided through bores 2a, 4a of the spring plate 9 and of the fixed plate 2 and where the tapered countersunk pins rest with their centering cones 6b at recessed openings 2b and 4b of the fixed plate 2 and of the connection plate 4.

The tapered countersunk pins 6, 6.1 are preferably provided with threads and adjustment means for adjustably positioning the tapered countersunk pins 6, 6.1 with their threads in the spring-supported plate 9. The tapered countersunk pins 6, 6.1 can be guided in fitted bores 9a of the spring-supported plate 9. The tapered countersunk pins 6, 6.1 can be axially fixed with a respective nut and a respective step in the pin diameter. The fixed plate 2 can be provided with an opening for locating the connection plate 4 such that a slot allowing relative motion of the fixed plate 2 and the connection plate 4 is provided between the edge of the connection plate 4 and the opening of the fixed plate 2. The tapered countersunk pins 6, 6.1 corresponding to the fixed plate 2 and the connection plate 4 are preferably placed in an alternating sequence on the spring-supported plate 9. The taper can form an angle of from about 40 to 50 degrees relative to the pin axis and the pin can be provided with two shoulders for positional definition. The pins corresponding to the fixed plate 2 and the connection plate 4 are preferably placed along a substantially circular line on the spring-supported plate or disk 9 and the opening for locating the connection plate 4 can be of a modified star-shape which is illustrated in the lower half of FIG. 2. The tips of the star arms can follow the outer border of the tapered countersunk pin locations on the connection plate 4 and the valleys between the star arms follow the inner border of the tapered countersunk pin locations on the fixed plate 2.

The support for a gripper 5 of an industrial robot according to the invention preferably comprises stop detent screws 10 mounted at the spring-supported plate 9 and directed toward the fixed plate 2 and, respectively, the connection plate 4. An electromagnetic approachment sensor 11 can be attached at the fixed plate 2 and directed to the fixed plate 2 and to the connection plate 4. A washer 7 can be disposed between the fixed-plate spring and the fixed plate 2 and between the connection-plate spring and the connection plate 4. A washer 7 can be disposed between the fixed-plate spring and the spring-supported plate 9 and between the connection-plate spring and the spring-supported plate 9.

A fixed plate 2 is attached by way of screws 3 to an end of a robot or work arm 1. The fixed plate 2 is provided with an extraordinary, multicornered, canted, central opening 2c which can be recognized from FIG. 2. A connection plate 4 for a gripper 5 is located in the central opening of the fixed plate while leaving available a slot X for mutual motion. The thickness of the fixed plate and the thickness of the connection plate can be from 0.5 to two times the thickness of the spring-supported plate. The fixed plate 2 and the connection plate 4 have bores 2a and 4a with conical openings 2b and 4b for centering cones 6b of tapered countersunk pins 6 and 6.1. The maximum diameter of the conical section of the tapered countersunk pin can be from about two to five times the size of the smaller diameter of the tapered section. The diameter of the bores 2a and 4a is larger by a factor of two times the size of the available slot for motion as compared to the diameter of the tapered countersunk pins 6, as illustrated in FIG. 4. In addition, a flattening 6c of a screw at the end of the thread, as illustrated in FIG. 4, is furnished for maintaining the tapered pin 6 upon tightening of the nut 6a.

As can be recognized from the left half of FIG. 1, four of the six tapered countersunk pins 6 guide via support disk washers 7 and helical springs 8 to a spring-supported plate 9, where the nuts 6a of the tapered countersunk pins 6 provide end stop detents and where the tapered countersunk pins are provided with a diameter shoulder 6d in each case. The shoulders of the tapered countersunk pin for providing stops can be associated with a diameter reduction in each case from about 10 to 30%. The connection plate 4 is maintained at this spring-supported plate 9 by way of tapered pins 6.1 and helical springs 8, as illustrated on FIG. 1 on the right-hand side. The diameter of the helical springs can be from about 1.1 to 1.5 the diameter of the tapered countersunk pin in its section guiding the spring. It can be recognized from FIG. 2 that the tapered pins 6 and 6.1 are disposed alternatingly on a circular arc of the spring-supported plate 9.

Four threaded bores 9b are provided on the spring-supported plate 9 in addition to the fitted bores 9a for the placing of the tapered pins 6 and 6.1. The threaded bores 9b are provided for adjustable stop screws 10, where the screw heads are disposed within the region of the slot X available for motion and which thereby limit the motion of the spring-supported plate 9 relative to the fixed plate 2 as well as of the connection plate 4 relative to the spring-supported plate 9. Approachment initiators 11 or distance sensors can be attached at the spring-supported plate 9 and can sense and announce the yielding against exerted forces of the spring-supported suspension for control of the robot. The signals of the approachment initiators can also be used during operation in a precise motion or for recognizing of dislocations and displacements during the gripping process. Tubes containing a pressurized media, not illustrated here, are led from the work arm 1 via bores 9d of the spring-supported plate 9 and of the fixed plate 2 to the gripper 5. Furthermore, electrical conduits, not illustrated here, run through the conducting bore holes 9c of the connection plate or disk 4 to the gripper 5. The connection plate 4 is, in addition, provided with a central bore 4c which can serve, for example, as an opening for looking through the attachment.

The yielding and resilient support can become effective in various ways.

If the work arm 1 presses the material to be transported with the gripper 5 against the device, for example, upon placing of the material to be transported in a device, then the connection disk 4 is lifted up and the springs 8.1 are pressed toward the spring-supported plate 9. During this step, the conical openings 4b in the connection plate 4 lift off from the centering cones 6b.1 of the tapered pin 6.1. This allows a lateral staggering and displacement as well as the assumption of an inclined position of the gripper. Since the conical angle amounts to from about 80 to 100 degrees, and preferably is near 90 degrees, the possible lateral displacement is always equal to that amount by which the springs 8.1 are pressed together. The size of the deflection is preset by the bore 4a towards all sides by from about 2 to 10 mm and preferably by 4 mm. The reason for this is the size of the bore, which is by two times 4 mm larger, that is 8 mm larger, than the diameter of the tapered pins 6.1.

If, however, the gripper 5 is pulled away by an external force in axial direction from the work arm 1, then the connection disk 4 pulls, via the tapered pins 6.1, the spring-supported plate 9 toward the fixed plate 2, whereby the springs 8 are further tensioned and the centering cone 6b of the tapered pin 6 exits out of the opening 2b of the fixed plate 2. In this context, there is generated a freedom of lateral motion between the tapered pin 6 and the bore 2a by an amount X, as was described in the previous example.

In addition to the already described possibilities of the gripper 5 to be moved and deflected versus the work arm 1 in an axial direction, there is also the possibility that the gripper 5 is moved and deflected laterally without it changing its distance in an axial direction relative to the work arm. In this case, a force radially attacking at the gripper 5 shifts, for example, the gripping force of the gripper via the connection plate 4. Thereby, the tapered pins 6.1 are shifted radially as well as axially via the conical openings 4b in the direction of the gripper 5. At the same time, the fixed plate 2 with the tapered pins 6 are also radially as well as axially shifted in the direction of the gripper 5. Since, in this case, the springs 8.1 as well as the springs 8 have to be pressed together, double the force is required for the shifting of the support, whereas in the case of the compression and pulling apart of the support, only the springs 8 or only the springs 8.1 have to be pressed together. This effect of double trigger release force occurs always as soon as the shifting path in radial direction is larger than the amount of the axial shifting.

However, in the herein described embodiment, the double shifting path is also possible. The connection plate 4 is shifted with respect to the spring plate 9 and, at the same time, the spring plate 9 is also shifted with respect to the fixed plate 2. Thus, the shifting paths are added in radial direction of the shifting possibilities of the support described above. However, the radial shifting path is additionally limited by the width of the motion-limiting slot 12 (max. 2 . x) between the fixed plate 2 and the connection plate 4.

According to the embodiment, the slot for motion is however only $1 \times X$, that is for example 4 mm wide, such that only half of the maximum possible deflection and displacement can be employed. The slot for motion can have a width from about 1 to 20 mm and is preferably between 2 and 10 mm wide.

The practical and factual requirements of the spring support during practical operation of the industrial robot is a superposition of the three recited load cases. In each case of deflection of the gripper 5, however, there has to be overcome a certain starting force caused by the pretensioning of the springs 8 and 8.1. The pretensioning of the springs 8 and 8.1 and, thus, also the starting force can be adjusted by the selection of the springs 8 and 8.1 and of the support disks or washers 7. The pretensioning force has to be selected to be at least so large that, during manoeuvering of the gripper arm, there does not occur any unintentional displacement and deflection based on the weight force of the gripper and of the objects to be transported.

According to the embodiment disclosed, the tapered pins 6 and 6.1 are placed along a circular arc on the spring-supported plate 9. The diameter of the circular arc for the tapered countersunk pins can be from about 5 to 50 times the thickness of the spring-supported plate. If the spatial situation and the force situation allow, then the tapered pins 6.1 can be located on a smaller radius as compared to the radius corresponding to the tapered pins 6 such that the inner edge of the fixed plate 2 as well as the outer edge of the connection disk 4 are circular. However, it has to be noted that, in this case, the lever-force relationships upon the initiation of tilting forces on the springs 8.1 are different than upon the arrangement of the tapered pins 6 and of the helical springs 8 along a radius.

The diameter of the tapered countersunk pins in their cylindrical region can be from about ¼ to the full thickness of the spring-supported plate.

Referring now to FIG. 5, there is shown a system in a perspective view employing the gripper according to the invention. Two parallel rails 52 are supported by stands 11. A roller carriage 44, movably mounted to the rail 52, carries a cross rail 42. The cross rail 42 is supplied with electrical power by a flexible electrical connection conduit 17. The cross rail 42 in turn carries a carriage 19 which includes a motor. This motor is connected to the power provided to the cross rail via a flexible electrical connection conduit 18. The carriage 19 has attached an arm 1 to which the support for a gripper is mounted. End rails 20 are provided to limit the motion of the cross rail 42 along the rail 52.

Figure 6:
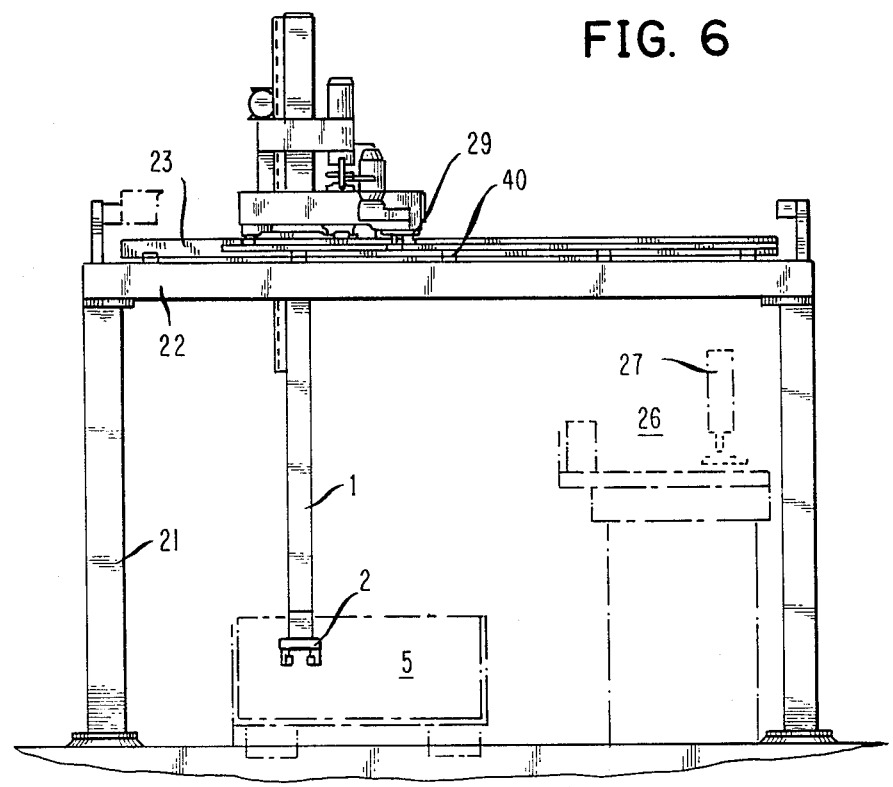
FIG. 6 is a side elevational view of another embodiment illustrating the positioning of the gripper.

Referring now to FIG. 6, there is shown a side view of a robot system. There is shown a working area 5 in the area of which the support 2 for a gripper operates. The support 2 is mounted to the robot arm 1, which in turn is mounted to a robot carriage 29, which is driven by an electric motor 24. The carriage can move along a support piece 23 which is disposed slightly above rails 22. The rails 22 are supported by stands 21. A control system 26 is provided for operating the robot. A display screen 27 allows to view the monitoring data relating to the operation of the robot and data input for controlling the robot.

It will be understood that each of the elements described above, or two or more together, may also find a useful application in other types of gripping-system configurations and goods-moving procedures differing from the types described above.

While the invention has been illustrated and described as embodied in the context of an industrial robot, it is not intended to be limited to the details shown, since various modifications and structural changes may be made without departing in any way from the spririt of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A support for a gripper of an industrial robot comprising
   a fixed plate;
   a connection plate;
   a spring-supported plate;
   means for maintaining an approximate relative position of the spring-supported plate relative to the fixed plate;
   means for supporting and maintaining an approximate relative position of the connection plate relative to the spring-supported plate;
   a fixed-plate stop providing a rest position between the fixed plate and spring-supported plate;
   fixed-plate springs disposed between the fixed plate and spring-supported plate for maintaining a relative position between the fixed plate and spring-supported plate with reference to the fixed-plate stop;
   a connection-plate stop providing a rest position between the connection plate and spring-supported plate;
   connection-plate springs maintaining a relative position between the spring-supported plate and connection plate with reference to the connection-plate stop.

2. The support for a gripper of an industrial robot according to claim 1 further comprising a mounting means for a gripper located at the connection plate and
   wherein the connection plate is mounted to a side of the spring-supported plate where the gripper is placed, wherein the fixed plate forms an abutment for the fixed-plate stop, and
   wherein the connection plate faces the same side of the spring-supported plate as is faced by the connection plate.

3. The support for a gripper of an industrial robot according to claim 1,
   wherein the stops are provided as centering cones of tapered countersunk pins;
   wherein the fixed-plate springs are helical compression springs which are guided by the tapered countersunk pins;
   wherein the connection-plate springs are helical compression springs which are guided by the tapered countersunk pins;
   wherein the tapered countersunk pins are attached to a respective plate with a nut near the end of the tapered countersunk pin opposite to an end of the tapered countersunk pin with reference to a taper of the tapered countersunk pin;
   wherein an opposite plate, disposed opposite to the respective plate with reference to a nut, is provided with openings for guiding and for providing support to the tapered countersunk pins at their taper.

4. The support for a gripper of an industrial robot according to claim 3,
   wherein the openings for guiding and for providing support to the tapered countersunk pin are formed as bores at the side of the opposite plate having a smaller clear diameter of the opening for guiding and for providing support,
   wherein the tapered countersunk pins are guided through bores of the fixed plate and of the connection plate and where the centering cones of the tapered countersunk pins, guiding the fixed plate springs, rest at openings of the fixed plate, and where the centering cones of the tapered countersunk pins, guiding the connection plate springs, rest at openings of the connection plate.

5. The support for a gripper of an industrial robot according to claim 3,
   wherein the tapered countersunk pins are provided with threads; and
   adjustment means for adjustably positioning the tapered countersunk pins with their threads in the spring-supported plate.

6. The support for a gripper of an industrial robot according to claim 1,
   wherein tapered countersunk pins are guided in fitted bores of the spring-supported plate; and
   wherein the tapered countersunk pins are axially fixed with a respective nut and a respective step associated with a step change in the pin diameter.

7. The support for a gripper of an industrial robot according to claim 1,
   wherein the fixed plate is provided with an opening for locating the connection plate such that a slot allowing relative motion of the fixed plate and the connection plate is provided between the edge of the connection plate and the opening of the fixed plate.

8. The support for a gripper of an industrial robot according to claim 7,
   wherein tapered countersunk pins, with reference to the fixed plate and the connection plate, are placed in an alternating sequence on the spring-supported plate and wherein a taper of the tapered countersunk pins forms an angle of from about 40 to 50 degrees relative to the pin axis and wherein the pin is provided with two shoulders for allowing to define a relative position.

9. The support for a gripper of an industrial robot according to claim 8,
   wherein pins associated with the fixed plate and the connection plate are placed along a substantially circular line on the spring-supported plate and where the opening for locating the connection plate has a modified star-shaped formed edge where the tips of star arms follow the outer border of tapered countersunk pin locations on the connection plate, and where valleys between the star arms follow the inner border of the tapered countersunk pin locations on the fixed plate.

10. The support for a gripper of an industrial robot according to claim 1, further comprising stop detent screws mounted at the spring-supported plate and directed toward the fixed plate and, respectively, the connection plate.

11. The support for a gripper of an industrial robot according to claim 1, further comprising
an approachment sensor attached at the fixed plate and directed to the fixed plate and to the connection plate.

12. The support for a gripper of an industrial robot according to claim 1, further comprising an electromagnetic approachment sensor attached to the connection plate.

13. The support for a gripper of an industrial robot according to claim 1, further comprising
a washer disposed between the fixed-plate springs and the fixed plate and between the connection-plate springs and the connection plate.

14. The support for a gripper of an industrial robot according to claim 1, further comprising
a washer disposed between the fixed-plate springs and the spring-supported plate and between the connection-plate springs and the spring-supported plate.

15. A support for a gripper of an industrial robot comprising
a fixed plate and a spring-supported plate maintained at a distance to each other at the end of a work arm of an industrial robot for supporting a gripper connection plate, which gripper connection plate protrudes with a junction mounting for the gripper through the fixed plate disposed toward the gripper, the improvement comprising
first springs (8) which maintain the spring-supported plate (9) against a stop, wherein the first springs (8) are disposed between the spring supported plate and the fixed plate, providing an abutment representing a detent stop, and where the connection plate for the gripper or the like is supported at the spring-supported plate (9) on the side of the fixed plate (2), which spring supported plate can be pressed by second springs (8.1) against stops.

16. The support for a gripper of an industrial robot according to claim 15,
wherein the detent stops and the abutments are nuts (6a) and centering cones (6b) of tapered countersunk pins (6, 6.1), where the springs (8, 8.1) are guided between the spring-supported plate (9) and a member of the group consisting of the fixed plate (2) and the connection plate, where the tapered countersunk pins (6, 6.1) are guided through bores (2a, 4a) of the spring-supported plate (9) and of the fixed plate (2) and where the tapered countersunk pins rest with their centering cones (6b) at recessed openings (2b) (4b) of the fixed plate (2) and of the connection plate (4).

17. The support for a gripper of an industrial robot according to claim 16,
wherein the tapered countersunk pins are provided with threads and adjustment means for adjustably positioning the tapered countersunk pins with their threads in the spring-supported plate;
wherein the tapered countersunk pins are guided in fitted bores of the spring-supported plate;
wherein the tapered countersunk pins are axially fixed with a respective nut and a respective step associated with a step change in the pin diameter;
wherein the fixed plate is provided with an opening for locating the connection plate such that a slot allowing relative motion of the fixed plate and the connection plate is provided between the edge of the connection plate and the opening of the fixed plate;
wherein the tapered countersunk pins associated with the fixed plate and the connection plate are placed in an alternating sequence on the spring-supported plate and wherein a taper of the tapered countersunk pins forms an angle of from about 40 to 50 degrees relative to the pin axis and wherein the pin is provided with two shoulders for allowing to define a relative position of the pin;
wherein pins associated with the fixed plate and the connection plate are placed along a substantially circular line on the spring-supported plate and where the opening for locating the connection plate has a modified star-shaped formed edge;
where the tips of star arms follow the outer border of tapered countersunk pin locations on the connection plate and where valleys between the star arms follow the inner border of the tapered countersunk pin locations on the fixed plate.

18. The support for a gripper of an industrial robot according to claim 15 further comprising
stop detent screws mounted at the spring supported plate and directed toward the fixed plate and, respectively, the connection plate;
an electromagnetic approachment sensor attached at the fixed plate and directed to the fixed plate and to the connection plate;
a washer disposed between the first spring and the fixed plate and between the second spring and the connection plate; and
a washer disposed between the first spring and the spring-supported plate and between the second spring and the spring-supported plate.

19. A method for assembly of a gripper support of an industrial robot comprising mounting a fixed plate to a gripper stand;
furnishing a fixed-plate stop providing a rest position between the fixed plate and a spring-supported plate;
resiliently supporting the spring-supported plate with fixed-plate springs disposed between the spring-supported plate and fixed plate for maintaining a relative distance between the fixed plate and spring-supported plate with reference to the fixed-plate stop;
supporting an approximate relative position of the spring-supported plate relative to the fixed plate;
furnishing a connection plate stop providing a rest position between the spring-supported plate and a connection plate;
resiliently supporting the connection plate with connection-plate springs maintaining a relative distance between the spring-supported plate and connection plate with reference to the connection-plate stop;
maintaining an approximate relative position of the connection plate relative to the spring-supported plate;
mounting a gripper to the connection plate on the same side where the gripper is placed such that the fixed plate forms an abutment for the fixed-plate stop and such that the connection plate is disposed on the same side of the spring-supported plate as is the connection plate.

20. The method for assembly of a gripper support of an industrial robot according to claim 19, further comprising providing the stops as centering cones of tapered countersunk pins;

forming openings for guiding and for providing support to tapered countersunk pins as bores on the side for positioning a respective opposite plate with a smaller clear diameter of the opening;

guiding the tapered countersunk pins through bores of the fixed plate;

guiding helical compression springs with the tapered countersunk pins for maintaining a distance between the fixed plate and spring-supported plate;

guiding the tapered countersunk pins through bores of the connection plate;

guiding helical compression springs with the tapered countersunk pins for maintaining a distance between the connection plate and spring-supported plate;

placing a respective opposite plate on an opposite side of said respective plate provided with openings for guiding and for providing support to the tapered countersunk pins at the location of their taper;

attaching tapered countersunk pins to a respective plate with a corresponding nut near an end of the tapered countersunk pin opposite to an end of the tapered countersunk pin corresponding to a taper of the tapered countersunk pin;

resting the centering cones of the tapered countersunk pins guiding the fixed plate springs at openings of the fixed plate; and resting the centering cones of the tapered countersunk pins guiding the connection plate springs at openings of the connection plate.

* * * * *